FIG. 2
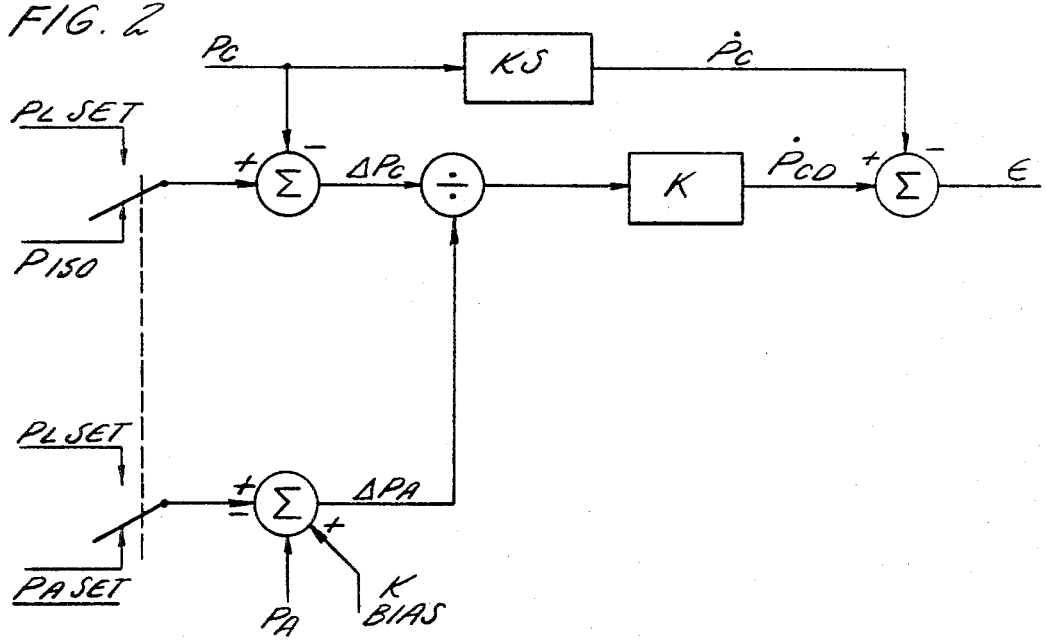
FIG. 3
$$\frac{dP_C}{dt} = f(\Delta P_C, \Delta P_A)$$
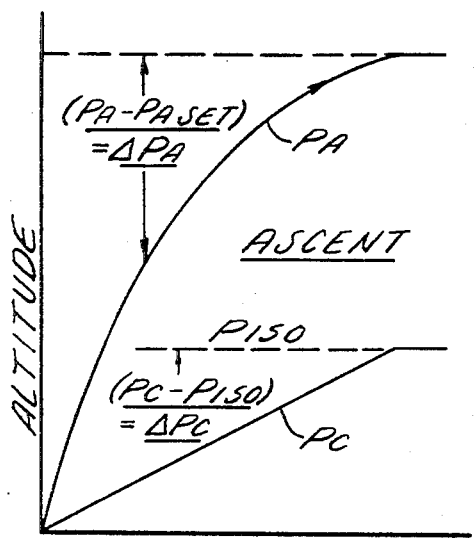
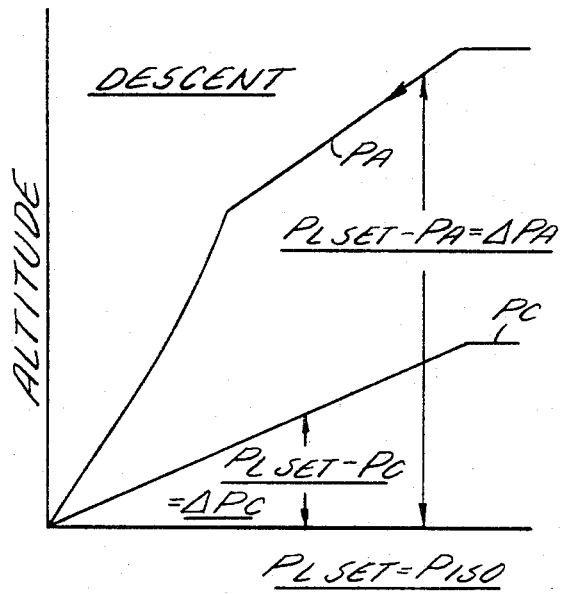

United States Patent Office 3,473,460
Patented Oct. 21, 1969

3,473,460
CABIN PRESSURE RATE CONTROLLER
Floyd R. Emmons, Granby, Conn., assignor to United
Aircraft Corporation, East Hartford, Conn., a corporation of Delaware
Filed Jan. 17, 1968, Ser. No. 698,551
Int. Cl. B64d 13/00
U.S. Cl. 98—1.5                    11 Claims

ABSTRACT OF THE DISCLOSURE

The cabin pressure of an aircraft is self-adjusted for ascent and descent by continuously scheduling the rate of change of pressure in the cabin. The controlling parameter is obtained by measuring ambient and cabin pressures which are computed to a ratio signal indicative of $\Delta P_c/\Delta P_a$ where
$\Delta P_c$ is the difference between actual cabin pressure and the cabin pressure at the destination and
$\Delta P_a$ is the difference between actual ambient pressure and the ambient pressure at the destination.

Background of the invention

My copending patent application entitled "Cabin Pressure Regulator," Ser. No. 564,114, filed July 6, 1966, now issued into Patent No. 3,376,803 and assigned to the same assignee, describes and claims a cabin pressure regulation system wherein the pressure in the aircraft cabin is controlled automatically throughout the entire phase of an aircraft flight profile including ascent, cruise and descent. For some aircraft applications, a reduction in the automation is permissible since manpower is available in the cockpit to attend to the control of the cabin pressure during these critical phases and, thus, some system complexity may be eliminated in favor of a simpler automatic cabin pressure control.

As is obvious to one skilled in this art, one of the more taxing tasks for the flight crew is monitoring the progress of cabin pressure during the ascent or descent. This involves setting the rate control, monitoring the cabin rate, the cabin pressure, relative to its destination and the aircraft altitude relative to its destination. The purpose of this invention is primarily to automate this task, although it should be obvious that it can be used in conjunction with features described in my copending application, 564,114, supra.

Additionally, the criterion for passenger comfort, with respect to cabin pressure control, is the rate of change of cabin pressure. Thus, the optimum cabin pressure control minimizes the rate-of-change within allowable limits as dictated by the maximum allowable cabin-to-ambient pressure differential and the aircraft climb and descent rate.

This pressure control, in effect, controls the progress of the cabin pressure by monitoring the differential between the existing cabin pressure and its final value, and causing the rate of change of cabin pressure to be proportional to this quantity, and further by monitoring the difference between the aircraft altitude and its final value and causing the rate of change to be inversely proportional to this quantity.

Further modifications to this basic scheme include non-linear proportionality constants in order to cause the cabin pressure to ascend or descend at a constant rate while the aircraft ascent or descent rate varies in order to follow the optimum flight profile. Also, a constant can be added to the quantity $\Delta P_a$ in order to prevent the rate from becoming unstable as the quantity $\Delta P_c/\Delta P_a$ approaches zero.

Thus, according to this invention, the relative progress of the aircraft and the cabin are monitored so as to adjust the rate of change of cabin pressure to keep the progress of the cabin up with the progress of the aircraft. By this, short-time rapid descents or ascents by the aircraft are ignored by the control and only the relatively long term aircraft maneuvers will effect cabin rate. Therefore, no absolute rate limit is necessary or desirable. This feature is desirable for the following reasons: If the aircraft should make an emergency descent, the cabin rate will increase as this is desirable to avoid the cabin pressure from dropping below the ambient pressure thus incurring a condition requiring negative relief. Many normal descents are made in steps as the aircraft descends from one level of clearance to the next. Therefore, the cabin will not rate rapidly during the steps but will rather follow the long term trend of the steps.

Summary of invention

It is therefore an object of this invention to control the pressure in a cabin of an aircraft by scheduling the rate of change of this cabin pressure as a function of the ratio of the remaining change in aircraft cabin pressure ($\Delta P_c$) to the remaining change in ambient pressure ($\Delta P_a$).

Other features and advantages will be apparent from the specification and claims and from the accompanying drawings which illustrate an embodiment of the invention.

Brief description of the drawings

This object is accomplished by a system as hereinafter described in conjunction with the figures wherein:
FIGURE 2 is another schematic showing an alternate arrangement for this invention.
FIGURE 3 is a graphical illustration of typical aircraft descent and ascent flight profiles.

Description of the preferred embodiments

Figure 1:
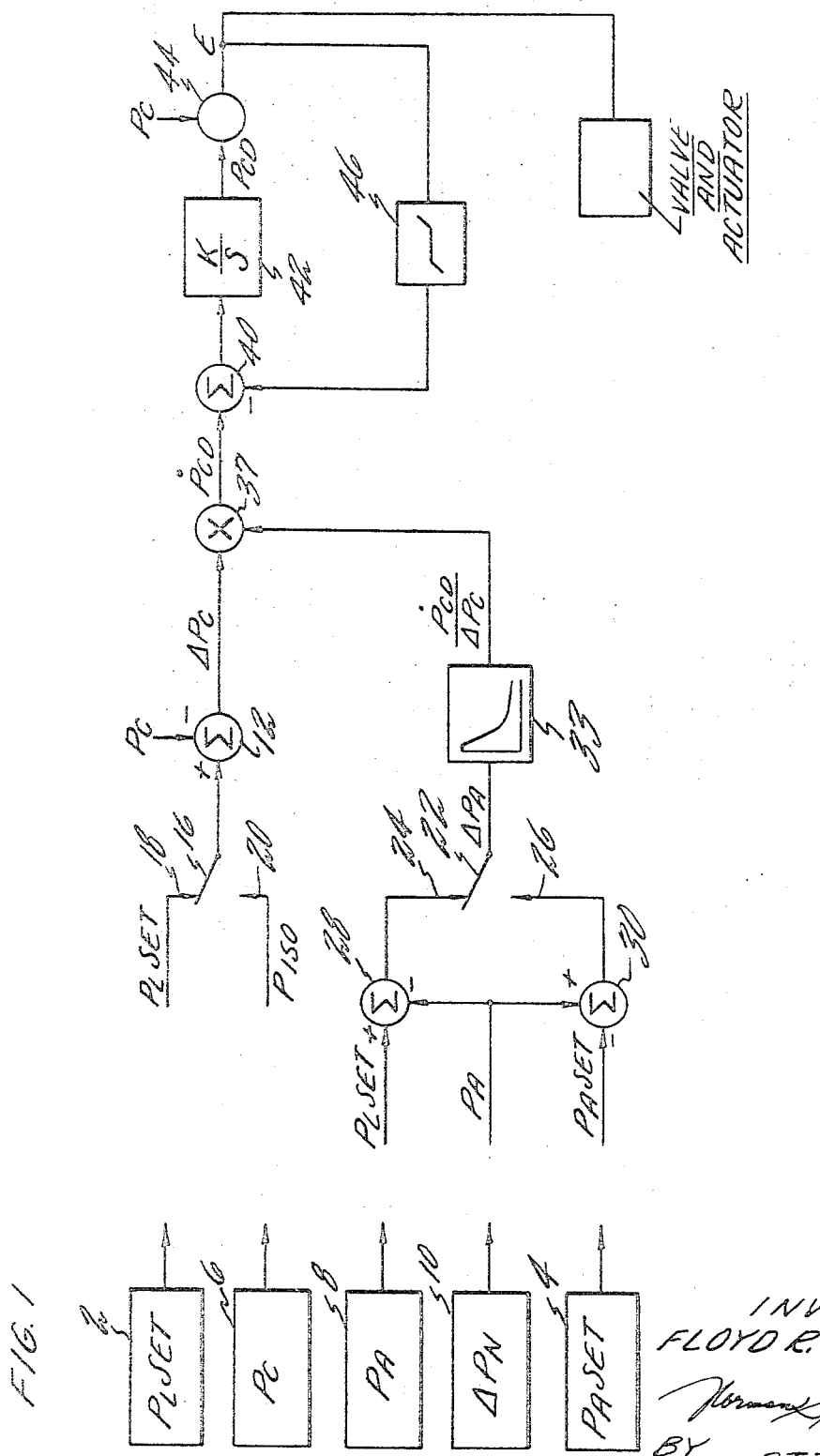
FIGURE 1 is a schematic illustration showing a preferred embodiment of this invention.

In FIGURE 1, the essentials for a cabin pressure control are shown. It is to be realized, however, that various refinements as disclosed in my copending application, Ser. No. 564,114, supra, may be added without altering the basic control concept disclosed and reference is hereby made thereto. Two sets of scheduled signals are generated with networks 2 and 4 and these are, respectively, $P_L$ (set) and $P_a$ (set). $P_a$ (set) represents the scheduled external ambient pressure for the cruise phase of the aircraft and usually is scheduled at the time of takeoff. $P_L$ (set) is the landing field pressure and also is set at the time of takeoff or may be determined at some later time during the flight. The method of generating the two signals is by conventional means as disclosed in my copending application, Ser. No. 564,114, supra, and involves the usual potentiometers and barometric correction as described. The actual cabin pressure is sensed by a transducer 8 which produces an electrical signal proportional to the actual ambient pressure external to the cabin. In addition, a maximum differential pressure signal is generated, $\Delta P_n$ from a network 10 and this is representative of the maximum differential pressure that can be tolerated across the hull of the aircraft, between the ambient and cabin pressures. The cabin and ambient pressure transducers and the differential pressure signal generator may be of the potentiometer type all of which are described in my copending application, 564,114, supra.

As previously mentioned the basic concept in this invention involves the scheduling of the rate of cabin pressure change as a function of the ratio of $\Delta P_c$ to $\Delta P_a$, both of which represent the remaining change in cabin and ambient pressures, respectively.

The $\Delta P_c$ signal is generated by circuitry including the summing network 12 and the switch pole 16. The contact 18 is shown coupled to the pole 16 and therethrough to one input of the summing amplifier 12. The other input to the summing amplifier 14 is the actual cabin pressure signal $P_c$ and is applied to the negative input of the summing amplifier 12 so that the net output from this summing amplifier is $\Delta P_c$. Thus, with the switch 16 in the position as shown in FIG. 1 the $\Delta P_c$ signal is representative of the remaining change in the scheduled cabin pressure during the landing phase of the aircraft.

When the pole 16 is contacting contact 20, $\Delta P_c$ is again generated but now is indicative of the remaining change in cabin pressure during the ascent phase of the aircraft. This is obtained by first generating a signal indicative of the scheduled cabin pressure during the cruise phase $P_{iso}$ and applying it to the summing amplifier 12 in the same manner as described above. It is realized that $P_{iso}$ can be generated in different manners as described in my copending application. For instance, during low altitude scheduled flights, it may not be necessary to fly the aircraft at an elevated cabin pressure so that the actual differential pressure across the hull remains below the maximum if the cabin pressure is kept at the scheduled landing field pressure. In such case, $P_{iso}$ may be the same as the landing field pressure so that a minimum of scheduling during the ascent phase is needed. For simplification reasons, this refinement of the $P_{iso}$ generation is not shown in FIGURE 1.

The generation of the $\Delta P_a$ signal, the remaining change in ambient pressure, is obtained as follows. During the descent, the pole 22 is connected to contact 24 which is in turn coupled to the output of summing amplifier 28 which has in turn as inputs the signals $P_L$ (set) and the ambient pressure signal $P_a$. With the polarities as indicated in FIGURE 1, the net output of this summing amplifier at contact 24 is the remaining change in ambient pressure as the craft descends towards the landing field. Similarly, when the pole 22 is coupled to the contact 26 for the ascent phase of the craft, the output of summing amplifier 30 which has its inputs coupled to the ambient signal $P_a$ and scheduled $P_a$ (set) produces the remaining change in ambient pressure for the ascent phase of the aircraft. The pole 22 is in turn coupled to one of the inputs of a function generator 33 which serves to generate a signal indicative of the derivative of $P_c$ with respect to time divided by $\Delta P_c$. The $\Delta P_c$ signal is coupled to the output of function generator through the multiplying network 37 so that the denominator of the differential signal is cancelled and is scheduled to be proportional to the desired rate of change of the cabin pressure may or may not be non-linear depending upon aircraft climb and/or descent characteristics.

$\dot{P}_c$. It should be understood that function generator 33 The actual cabin pressure signal $P_c$ is coupled to one of the inputs of the summing amplifier 44 to provide at the output the error signal used to drive the actuator and valve 46 in such a direction to drive the error to a minimum value. A portion of the error when it exceeds a predetermined amount, is fed back to the summing amplifier 40 in order to prevent large error signals. This is accomplished via the tracking circuit 46 which only provides an output when the error signal exceeds predetermined negative or positive limits as shown by the response curve of the tracking circuit. Further details on the tracking circuit are disclosed in the copending application by Stanley G. Best entitled "Scheduled Generator Tracking Circuit and Rate Limiter," Serial No. 564,226, filed July 11, 1966, and assigned to the same assignee.

Since the pressure rate control is based upon the $\Delta P_c$ and $\Delta P_a$ signals, the desired cabin pressure rate signal $\dot{P}_{cd}$ should be inversely proportional to $\Delta P_a$ and proportional to $\Delta P_c$. Therefore, if the aircraft climbs or descends rapidly, thus decreasing $\Delta P_a$, the rate for the desired cabin pressure signal $\dot{P}_{cd}$ becomes more rapid but as $\Delta P_c$ tends to decrease, the pressure rate should also tend to decrease resulting in a limiting of the pressure rate by a counterbalance effect. The embodiment shown in FIGURE 2 is a variation of the basic scheme which controls the rate by setting a rate reference $\dot{P}_{cd}$, sensing the actual rate of change by taking the derivation of cabin pressure, $P_c$ to get $\dot{P}_c$, and comparing $\dot{P}_{cd}$ and $\dot{P}_c$, thus, giving an error signal $e$ which acts to drive the outflow valve thus correcting the rate error.

In the operation of FIGURE 1, the ascent of the cabin pressure is initiated at liftoff as the wheel switch senses the relief of the weight of the airplane. At this time, switch positions of the poles 16 and 22 are placed so that the input to the automatic control is to be $P_a$ (set) and $P_{iso}$. The signal $\Delta P_a$ is fed into the function generator 33 which generates an output signal $P_{cd}/\Delta P_c$. This signal is multiplied by $\Delta P_c$ which is the difference between $P_c$ and $P_{iso}$. The cabin will then rate at $\dot{P}_{cd}$. As the aircraft climbs $\Delta P_a$ will diminish and the changing cabin pressure will diminish $\Delta P_c$. If the aircraft decreases its climb rate, the cabin rate $\dot{P}_c$ will also diminish because $\Delta P_c$ will be increasing faster than $\Delta P_a$ and therefore the ratio $\Delta P_a/\Delta P_c$ will decrease. As the aircraft reaches its cruise altitude, $\Delta P_a$ will decrease to zero and $\Delta P_c$ will also reach zero although not necessarily at the same time. The cabin pressure rate will then be held to zero, as $\Delta P_c$ is zero. Descent of the cabin may be started by sensing when the ambient pressure $P_a$ exceeds the set cruise altitude pressure $P_a$ (set) by for instance .25 p.s.i. This is shown in greater detail in my copending application and now represents a commonly available technique for recognizing the occurrence of a descent mode. Upon the recognition of the descent mode, switch positions are automatically changed making $P_L$ (set) the input. The cabin pressure may then be continuously scheduled in the proportional manner as herein described until the desired cabin landing field pressure is reached.

In FIGURE 3, the most probable flight profiles of an aircraft in ascent and descent modes is shown for a span of flight conditions.

It should be understood that the invention is not limited to the particular embodiments shown and described here, in, but that various changes and modifications may be made without departing from the spirit or scope of this novel concept as defined by the following claims.

I claim:
1. A device for automatically regulating the pressure in an aircraft cabin exposed to varying external air pressure throughout the ascent and descent flight of the aircraft comprising:
   means for generating a $\Delta P_c$ signal continuously indicative of the remaining scheduled change in cabin pressure of the aircraft throughout ascent and descent of the aircraft,
   means for generating a $\Delta P_a$ signal continuously indicative of the remaining scheduled change in ambient pressure throughout the ascent and descent of the aircraft,
   means responsive to the $\Delta P_c$ signal and the $\Delta P_a$ signal for producing an error signal for varying the cabin cabin pressure rate of change,
   means for sensing the actual pressure in the aircraft cabin and producing a signal indicative thereof,
   means responsive to the actual cabin pressure signal and the desired cabin pressure rate of change signal for producing an error signals for varying the cabin pressure in a direction tending to drive said error signal to a minimum, and
   a divider network having a numerator input and a denominator input with said numerator input coupled to the $\Delta P_c$ signal and the denominator input coupled to the $\Delta P_a$ signal.

2. A device as recited in claim 1 wherein said error signal producing means comprises:
 means responsive to the actual cabin pressure signal for deriving the actual rate of change thereof,
 a difference circuit coupled to the desired cabin pressure rate of change signal and the actual rate of change cabin pressure signal for producing the difference therebetween said difference representing the error signal for controlling the pressure in the cabin.

3. A device as recited in claim 1 and further comprising:
 an integrator network responsive to said desired cabin pressure rate of change signal and producing a signal indicative of the desired cabin pressure, and
 means comparing said actual cabin pressure signal with said desired cabin pressure signal for producing said error signal indicative of the difference therebetween.

4. A device as recited in claim 1 and further comprising:
 a multiplier for modfying the output from the divider network to produce the desired rate of change in cabin pressure commensurate with a preselected optimum flight profile.

5. A device as recited in claim 1 and further comprising:
 means for generating a bias signal indicative of a preselected portion of the remaining change in ambient pressure,
 a summing network having a first input coupled to the bias signal and a second input coupled to the $\Delta P_a$ signal for producing the denominator signal to the divider network.

6. A device as recited in claim 5 wherein said bias signal generating means comprises the $\Delta P_c$ signal plus a constant bias.

7. A device as recited in claim 5 wherein said $\Delta P_a$ signal generating means comprises:
 means for scheduling a signal indicative of a preselected pressure level of said external environment,
 means for sensing the ambient pressure and producing a $\Delta P_a$ signal indicative thereof,
 a difference network responsive to the scheduled external ambient pressure and the sensed ambient pressure signal for producing the difference therebetween,
 and wherein said $\Delta P_c$ signal generating means comprises,
 means for scheduling a preselected maximum tolerable pressure differential $\Delta P_n$ between the ambient and the cabin, and
 a summing network responsive to said $\Delta P_n$ signal and the sensed ambient signal $P_a$ for producing the sum thereof.

8. A device for automatically regulating the pressure in an aircraft cabin exposed to a varying external air pressure comprising:
 means for sensing the pressure of the environment external to the cabin and producing an ambient signal, $P_a$, indicative thereof,
 means for scheduling a signal indicative of a preselected pressure level of said external environment,
 means responsive to the ambient signal and the preselected external cabin pressure signal for generating a $\Delta P_a$ signal indicative of the difference therebetween,
 a function generator responsive to the $\Delta P_a$ signal for generating a rate signal proportional to a desired rate of change of the cabin pressure,
 an integrator,
 said integrator having its input coupled to the rate signal for producing a signal indicative of the desired cabin pressure,
 means for sensing the actual cabin pressure and producing a signal indicative thereof, and
 means comparing the actual pressure signal with the designed cabin pressure signal and producing an error signal for varying the cabin pressure in a direction tending to drive said error signal to a minimum.

9. A device as recited in claim 8 wherein the function generator produces a $\dot{P}_c/\Delta P_c$ rate signal directly proportional to a desired rate of change of the cabin pressure and inversely proportional to a desired remaining change in the cabin pressure,
 means for scheduling a signal indictive of a preselected pressure level of the cabin pressure,
 means responsive to the preselected cabin pressure signal and the desired cabin pressure signal for producing a $\Delta P_c$ signal representative of the actual remaining change in the cabin pressure,
 means combining said $\Delta P_c$ signal with the $P_c/\Delta P_c$ rate signal for producing only the rate of change of the desired cabin pressure signal and applying said signal to the input of the integrator.

10. A device for automatically regulating the pressure in an aircraft cabin exposed to a varying external air pressure comprising:
 means for sensing the pressure of the environment external to the cabin and producing an ambient signal indicative thereof,
 means for scheduling a signal indicative of a preselected pressure level of said external environment,
 means responsive to the ambient signal and the preselected external cabin pressure for generating a signal indicative of the difference therebetween,
 a function generator responsive to the difference signal for generating a rate signal proportional to a desired rate of change of the cabin pressure,
 means for scheduling a signal indicative of a preselected pressure level of the cabin pressure,
 an integrator wherein the output from the integrator is negatively fed back to the input,
 said integrator further including,
 a difference input circuit coupled to the negative feedback signal and the preselected cabin pressure level signal for producing a signal indicative of the difference therebetween,
 a multiplier circuit coupled to the difference input circuit and the rate signal for producing the product therebetween, and
 where said integrator is driven by said product from the multiplier circuit and produces a signal indicative of the desired cabin pressure,
 means for sensing the actual cabin pressure and producing a signal indicative thereof, and
 means comparing the actual pressure signal with the desired cabin pressure signal and producing an error signal for varying the cabin pressure in a direction tending to drive said error signal to a minimum.

11. A device as recited in claim 10 wherein said function generator produces a rate signal proportional to the quotient of a desired rate of change of the cabin pressure to a desired remaining change in cabin pressure.

References Cited

UNITED STATES PATENTS

| 2,873,661 | 2/1959 | Fischer | 98—1.5 |
| 3,141,399 | 7/1964 | Andresen | 98—1.5 |
| 3,373,675 | 3/1968 | Best | 98—1.5 |

MEYER PERLIN, Primary Examiner

PO-1050
(5/69)

UNITED STATES PATENT OFFICE
CERTIFICATE OF CORRECTION

Patent No. 3,473,460      Dated October 21, 1969

Inventor(s) Floyd R. Emmons

It is certified that error appears in the above-identified patent and that said Letters Patent are hereby corrected as shown below:

| | | |
|---|---|---|
| Column 4, claim 1, line 63 | | "an error signal for varying the cabin" should be deleted and inserted therefor -- a rate signal indicative of a desired -- |
| "     "     line 69 | | "signals" should be -- signal |
| Column 6, claim 8, line 4 | | "designed" should be -- desir |
| Column 6, claim 9, line 12 | | "indictive" should be -- indicative -- |
| "     "     line 18 | | "$P_c/\Delta P_c$" should be -- $\dot{P}_c/\Delta P_c$ -- |
| Column 6, claim 10, line 31 | | after "pressure" insert -- signal -- |

SIGNED AND
SEALED
MAY 26 1970

(SEAL)
Attest:

Edward M. Fletcher, Jr.
Attesting Officer

WILLIAM E. SCHUYLER, JR.
Commissioner of Patents